June 14, 1960 W. H. LOCKWOOD 2,940,602
TIERABLE AND NESTABLE RECEPTACLE
Filed Feb. 21, 1957 6 Sheets-Sheet 1

INVENTOR.
WARREN H. LOCKWOOD
BY
Hyde, Meyer, Baldwin & Doran
ATTORNEYS

June 14, 1960 W. H. LOCKWOOD 2,940,602
TIERABLE AND NESTABLE RECEPTACLE
Filed Feb. 21, 1957 6 Sheets-Sheet 2

INVENTOR.
WARREN H. LOCKWOOD
BY
Hyde, Meyer, Baldwin & Doran
ATTORNEYS

INVENTOR.
WARREN H. LOCKWOOD
BY
Hyde, Meyer, Baldwin & Doran
ATTORNEYS

June 14, 1960 W. H. LOCKWOOD 2,940,602
TIERABLE AND NESTABLE RECEPTACLE
Filed Feb. 21, 1957 6 Sheets-Sheet 4

INVENTOR.
WARREN H. LOCKWOOD
BY
Hyde, Meyer, Baldwin & Doran
ATTORNEYS June 14, 1960 W. H. LOCKWOOD 2,940,602
TIERABLE AND NESTABLE RECEPTACLE
Filed Feb. 21, 1957 6 Sheets-Sheet 5

INVENTOR.
WARREN H. LOCKWOOD
BY
Hyde, Myer, Baldwin & Doran
ATTORNEYS

June 14, 1960 W. H. LOCKWOOD 2,940,602
TIERABLE AND NESTABLE RECEPTACLE
Filed Feb. 21, 1957 6 Sheets-Sheet 6

INVENTOR.
WARREN H. LOCKWOOD
BY
Hyde, Meyer, Baldwin & Doran
ATTORNEYS

United States Patent Office 2,940,602
Patented June 14, 1960

2,940,602

TIERABLE AND NESTABLE RECEPTACLE

Warren H. Lockwood, 10308 Morning Ave., Downey, Calif.

Filed Feb. 21, 1957, Ser. No. 641,564

17 Claims. (Cl. 211—126)

This invention relates to improvements in receptacles, and more particularly to receptacles adapted to be tiered when in use and to be nested when empty, and in which the tiering support portions are rigidly connected to the receptacle at all times.

This application is a continuation-in-part of my co-pending application Serial No. 309,885, filed September 16, 1952, for "Tierable Nesting Receptacle," now Patent No. 2,782,936, granted February 26, 1957.

An object of the present invention is to provide a receptacle adapted for tiering and nesting with receptacles of like construction, the receptacle having a bottom and upstanding discontinuous side wall portions rigid with the bottom and spaced around the bottom in a generally evenly distributed manner so as to hold an upper receptacle firmly and evenly tiered upon a lower receptacle. Each receptacle has a plurality of upper tiering support portions, one rigid with each of the side wall portions near the upper end thereof, and a plurality of lower tiering support portions near the bottom and rigid therewith, the upper support portions being vertically above the lower support portions. The receptacle is so constructed as to permit nesting of an upper receptacle within a lower like receptacle only when the bottom of the upper receptacle is tilted in a plane non-parallel to the bottom of the lower receptacle so as to cause the tiering support portions of one receptacle to clear the support portions of a like receptacle. Obviously, with the upper and lower support portions of a receptacle being vertically above each other, the mere resting of the lower support portions of an upper receptacle upon the complementary upper support portions of a lower like receptacle will cause the two receptacles to be stacked in a tiered relationship. There are clearways provided in the receptacle so as to permit these normally interfering parts of one receptacle to pass under the interfering parts, or through the interfering parts, of a second like receptacle, and the parts are so constructed and arranged as to permit the upper receptacle to pass downwardly inside of a lower like receptacle in a firmly nested relationship when the receptacle is not in use.

Other objects and advantages of the present invention will be apparent from the accompanying drawings and the essential features thereof will be set forth in the appended claims.

In the drawings:

Fig. 29 is a side elevational view of the receptacle of Fig. 28 showing in a fragmentary manner a second like receptacle in tiered relationship above the lower receptacle; while

My copending application Serial No. 309,885 relates to tiering and nesting receptacles more in the nature of enclosed baskets. The type of receptacle of the present application is more like a tray.

Figure 1:
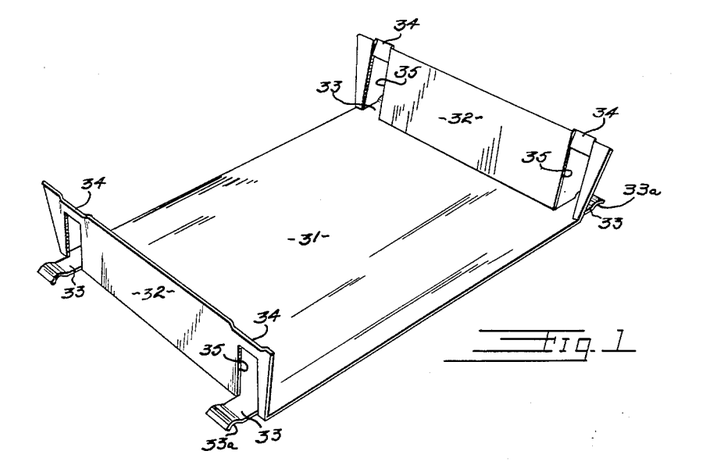
Fig. 1 is a perspective view of a receptacle embodying my invention having sheet metal end walls secured to the bottom along parallel lines.
Figure 2:
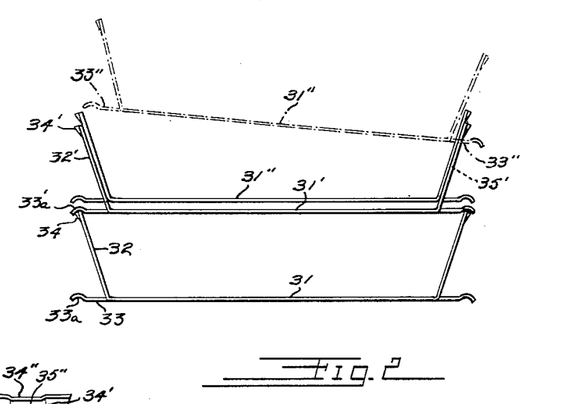
Fig. 2 is a side elevational view showing in full lines three of the receptacles of Fig. 1, the bottom and intermediate receptacle being in tiered relationship, the intermediate and upper receptacle being in nested relationship, and a receptacle in dot-dash lines indicating a step in the nesting process.
Figure 3:
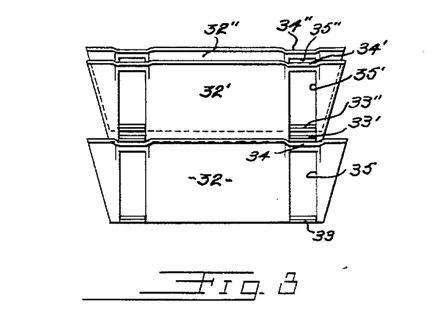
Fig. 3 is an end view of the receptacle of Fig. 2.

In the embodiment of Fig. 1 the tray has a generally rectangular bottom 31 of sheet metal or the like having the ends turned up at 32 along parallel lines where they join the bottom. Lower tiering support portions 33 are provided by means of four tongues which extend laterally away from the bottom beyond the zone where the side wall portions join the bottom. Upper support portions 34 are provided in the end walls 32 and it will be noted that these upper support portions are directly vertically above the curved hook portions 33a of each of the tongues 33. This is clearly seen in Fig. 2. Clearways are provided at 35 in the form of slots in the end walls extending upwardly from just above each of the tongues 33 to a zone slightly below the upper support portions 34. In utilizing two like receptacles, as described in connection with Fig. 1, an upper receptacle may be tiered upon a lower receptacle as shown in the intermediate and bottom receptacles in full lines in Fig. 2. Here the intermediate receptacle has parts which bear the same reference characters as the receptacle of Fig. 1 except that they have been given a prime suffix. It will be noted that each of the lower support portions 33a' of the intermediate receptacle rest directly upon the upper support portions 34 of the lowermost receptacle. To cause two like receptacles to nest one within the other, the upper receptacle is tilted as shown in the dot-dash lines of Fig. 2 until the tongues 33" of the uppermost receptacle have passed through the clearways 35' of the intermediate receptacle at one end thereof. As viewed in Fig. 2, there is then sufficient clearance between the opposite ends of the lower receptacle to permit the tongues 33" at the opposite end of the receptacle to pass downwardly and into and through the clearways 35' at the left-hand end of the lower receptacle as viewed in Fig. 2. The uppermost receptacle in Fig. 2 may then move downwardly from the dot-dash position to the full line position which is the fully nested relationship of the two receptacles. Fig. 3 is an end elevational view of the three full line receptacles of Fig. 2 wherein the bottom and intermediate receptacles are in tiered relationship and the intermediate and uppermost receptacles are in nested relationship.

Figure 4:
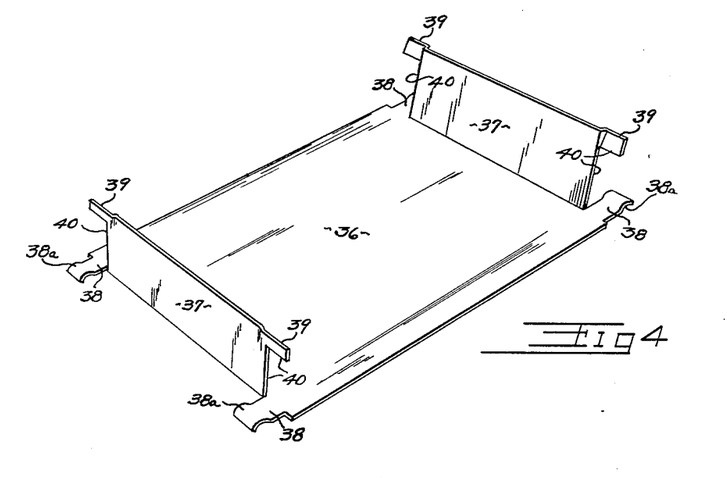
Fig. 4 shows a modification of my invention which is somewhat similar to that of Fig. 1, the end walls of Fig. 1 being modified in Fig. 4.
Figure 5:
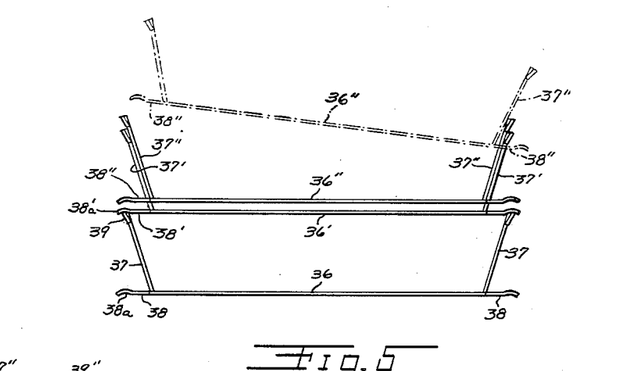
Fig. 5 is a side elevational view showing in full lines three of the receptacles of Fig. 4, the bottom and intermediate receptacle being in tiered relationship, the intermediate and upper receptacle being in nested relationship, and the dot-dash view showing one of the steps in the nesting process.
Figure 6:
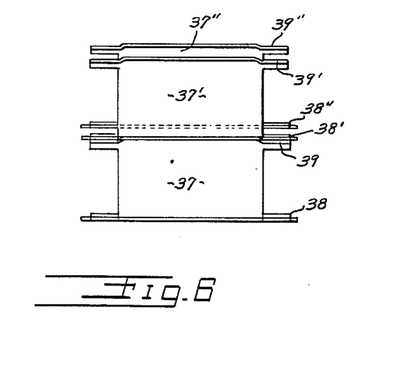
Fig. 6 is an end elevational view of the full line receptacles of Fig. 5.

Fig. 4 shows a modification in many respects similar to Fig. 1. Here the bottom 36 has two opposite end walls 37 connected with the bottom along parallel lines and integral therewith. The lower support portions comprise tongues 38 which extend laterally beyond the ends of the bottom, and preferably have shallow hook portions 38a for retaining two like receptacles in tiered relationship against endwise movement. Upper support portions 39 here occur as projections laterally from the end wall 37 and are vertically above the lower support portions 38a. The clearways are the openings 40 beneath the projecting upper support portions 39. In Fig. 5 the intermediate receptacle having the bottom 36' is in tiered relationship with the bottommost receptacle having the bottom 36. The lower support portions 38a' of the intermediate receptacle rest upon the upper support portions 39 of the lowermost receptacle. To cause the uppermost receptacle 30 having the bottom 36" to enter into the fully nested relationship, it is first necessary to tilt this uppermost receptacle as indicated in dot-dash lines in Fig. 5 causing the tongues 38" of one end of the uppermost receptacle to pass through the clearways 40' of the intermediate receptacle at one end, after which the tongues 38", at the opposite or left-hand end in Fig. 5, may pass down into the intermediate receptacle and through the clearways 40' thereof to the fully nested position as shown in Fig. 5. It will be noted that the ends 37 slope upwardly and outwardly from their connection with the bottom 36 so as to permit this fully nested position of two like receptacles. Fig. 6 is an end elevational view of the three receptacles of Fig. 5.

Figure 7:
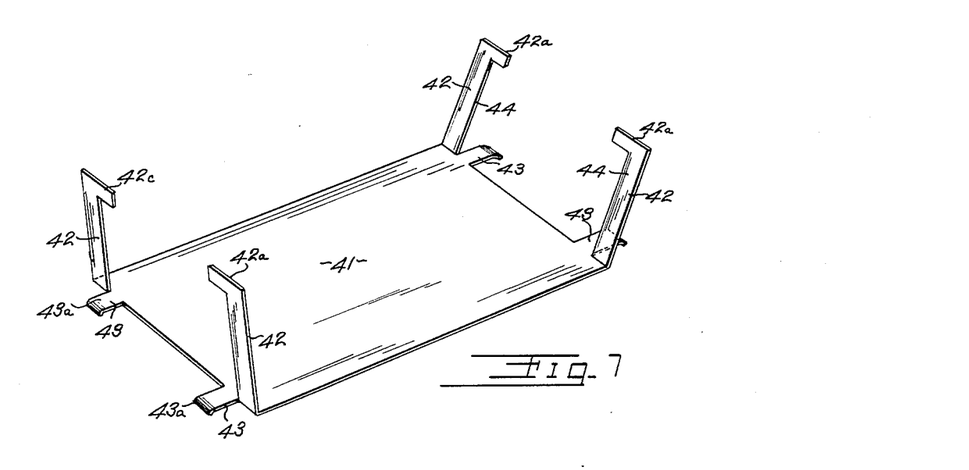
Fig. 7 is a further modification of my invention showing four corner posts having lateral projections at the top thereof to form the upper support portions.
Figure 8:
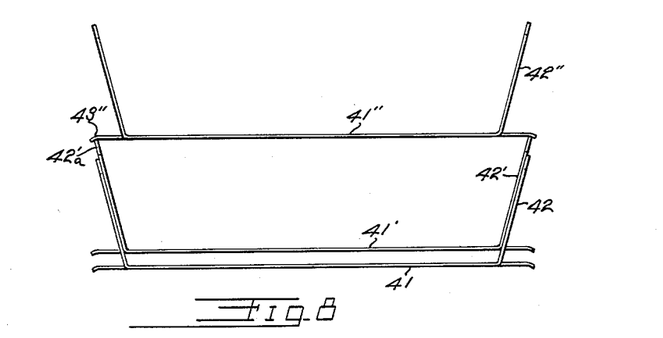
Fig. 8 is a side elevational view of three of the receptacles of Fig. 7, the bottom and intermediate receptacle being in nested relationship, the intermediate and upper receptacle being in tiered relationship.
Figure 9:
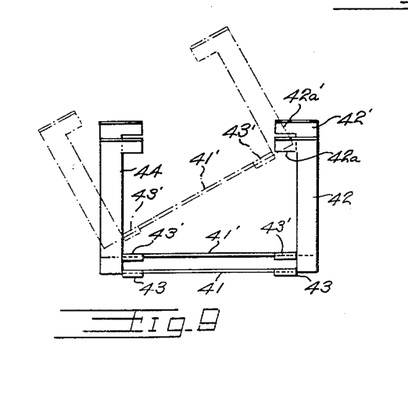
Fig. 9 is an end elevational view of the two nested receptacles of Fig. 8 with a dot-dash view of a receptacle being tilted in the course of achieving the nesting of two like receptacles.

In Fig. 7, I show another modification of my invention wherein the receptacle has a generally rectangular bottom 41 with four upstanding rigidly connected posts 42 at the four corners thereof. At the upper ends of each of the posts, a projection 42a extends laterally inwardly to form the upper support portions there. Tongues 43 extend laterally beyond the ends of the bottom 41 to form lower support portions vertically beneath the upper support portions 42a. It will be noted that the tongues 43 are turned downward slightly at the outer ends as indicated at 43a which prevents lateral displacement of two receptacles when they are in tiered relationship. Clearways 44 are provided from directly beneath each of the upper support portions 42a down to the tongues 43. Two like receptacles as shown in Fig. 7 may be moved into nested relationship either by endwise tilting as discussed in connection with Figs. 1 and 4, or by sidewise tilting as indicated in Fig. 9. Here a second receptacle, having the bottom 41', permits the left-hand tongue 43' to pass through the clearway 44 of the lower receptacle. It will then be noted, at the right of Fig. 9, that the tongue 43' of the upper receptacle will clear the upper support portion 42a of the lower receptacle, after which the upper receptacle may move down to the fully nested position shown in full lines in Fig. 9. In Fig. 8, I have shown a side elevational view of two receptacles having the bottoms 41 and 41' respectively in nested position, while a third receptacle having the bottom 41" is shown in tiered relationship with the intermediate receptacle. Here the lower support portions 43" of the uppermost receptacle rest upon the upper support portions 42a' of the intermediate receptacle. The lower portion of Fig. 8 shows that the posts 42 and 42' slope upwardly and outwardly so as to permit the fully nested position of Fig. 8.

Figure 10:
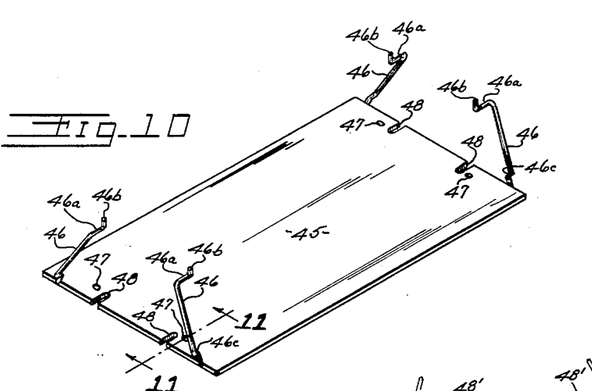
Fig. 10 shows a further modification of my invention wherein the upper support portions are provided by four posts having laterally projecting upper support portions at the upper ends of the posts, and having clearways comprising slots in the bottom to permit the nesting of two like receptacles.
Figure 11:
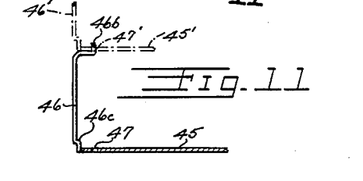
Fig. 11 is a fragmental sectional view taken along the line 11—11 of Fig. 10 and showing a lower receptacle in full lines and an upper receptacle in dot-dash lines tiered thereabove.
Figure 12:
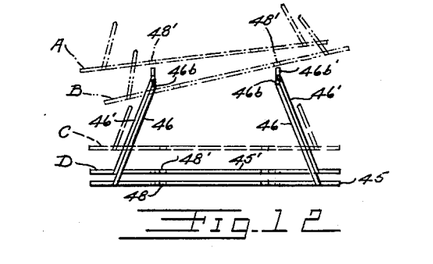
Fig. 12 is an end elevational view showing in full lines two of the receptacles of Fig. 10 in fully nested relationship, and in broken lines the successive positions of an upper receptacle as it is manipulated toward a nested position.

Figs. 10, 11 and 12 show another modification of my invention wherein the bottom of the receptacle 45 is generally rectangular in form having four posts 46 located respectively near each of the four corners of the tray. It is obvious that the shape of the bottom could be varied from the rectangular form and still utilize the invention. Each of the posts 46 has a lateral projection 46a extending inwardly above the bottom 45 and providing an upper support portion there. Preferably, but not necessarily, means is provided to prevent lateral shifting of two like receptacles when in tiered relationship. In Figs. 10 and 11, this arrangement includes upwardly extending tips 46b at the innermost ends of the support portions 46a and these are vertically directly above the holes 47 in the bottom 45. In the nested position of two trays, as shown in Fig. 11, the tips 46b of the lower receptacle pass through the openings 47 in the bottom 45' of the upper receptacle and hold the two receptacles from lateral shifting. To permit nesting of two of the receptacles like that shown in Fig. 10, clearways are provided which comprise the slots 48 opening outwardly toward the ends of the receptacle. These slots need not be spaced apart the same distance as the upper support portions 46a and in this case are not so spaced. The nesting operation of two like receptacles is shown in Fig. 12 with intermediate positions of the uppermost receptacle being indicated in broken lines. In the uppermost view which I have marked A, one of the slots or recesses 48, here the left one, is placed in register with the left-hand upper support portion 46b of the lower receptacle. The upper receptacle is then passed down until the support portion 46b of the lower receptacle has passed through the slot 48' of the upper receptacle. The upper receptacle is then shifted toward the right as shown in position B of Fig. 12 until the right slot 48' is in registration with the right-hand upper support portion 46b of the lower receptacle. The upper receptacle is then passed down to the position C and finally to the full line position D where the parts are fully nested. It will be noted that the sloping of the members 46 upwardly and inwardly toward each other permits the like members 46' of the upper receptacle to nest closely against of the lower receptacle in the fully nested position of Fig. 12. If desired, each post 46 may have a slight outward bend near the bottom as indicated at 46c to give a little more endwise play when achieving the nesting of two like receptacles, but the embodiment will work with or without this feature.

Figures 13, 14, 15:
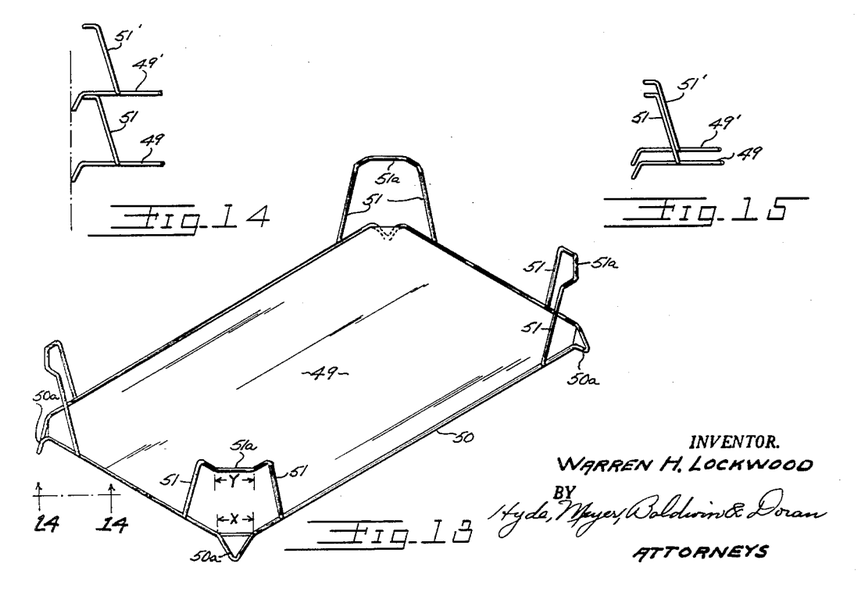
Fig. 13 is a perspective view of another modification of my invention wherein the upper support portions comprise bifurcated wire loops having their bifurcated arms rigidly secured to the bottom and straddling the corners of a rectangular bottom, the corners of the bottom being turned downwardly to provide hooks, and the bights of the wire loops being formed to snugly receive the hooks when two like receptacles are in tiered relationship.
Fig. 14 is a fragmental view taken approximately along the line 14—14 of Fig. 13 and showing how the corners of two like receptacles appear in a tiered relationship.
Fig. 15 is a fragmental view taken from the same position as Fig. 14 but showing the corners of two like receptacles in a fully nested relationship.

Figs. 13, 14 and 15 show still another embodiment of my invention. Here the bottom 49 is generally rectangular, preferably having its outer edge reinforced by a continuous strip of heavy wire 50. At each of the four corners of the bottom member, bifurcated wire loops 51 are rigidly secured to the bottom, on the outside of the wire 50, as by welding. The bifurcated arms of each wire loop are secured to the corner of the bottom in a manner to straddle the corner as clearly shown in Fig. 13. The bight at the upper end of each of the wire loops forms the upper support portions of this receptacle. Preferably, the bight is bent outward slightly to form a portion 51a offset slightly outwardly from the bifurcated legs 51. Preferably, at the four corners of the bottom, the wire 50 is bent down as indicated at 50a to provide hooks there to firmly secure an upper receptacle in tiered relationship on a lower receptacle as indicated in Fig. 14. Two receptacles like that of Fig. 13 will remain in tiered relationship whether or not the hooks 50a are provided, but if these hooks have a dimension X across the base thereof just slightly less than the dimension Y across the mid-portion of the bight 51a, then in tiered relationship the upper receptacle will be firmly held against lateral shifting relative to the lower receptacle. It will be noted that the base of each hook 50a (as indicated by the dimension X) lies vertically immediately below the straight portion in the middle of each bight 51a. In nesting two receptacles like that shown in Fig. 13, the upper receptacle is tilted in either direction to pass the hooks 50a either both of the hooks on one side or both of the hooks on one end through their respective bifurcated wire loops, after which the other end or other side of the receptacle may move downwardly to a fully nested position, one corner of which is shown in Fig. 15. It will be understood that all four corners nest in a similar manner. It will be seen that each of the bifurcated loops has its bifurcated arms lying in the same plane which slopes upwardly and outwardly from the bottom so as to facilitate the nesting relationship as seen in Fig. 15.

Figures 16, 17, 18, 19, 20, 21, 22, 23, 24:
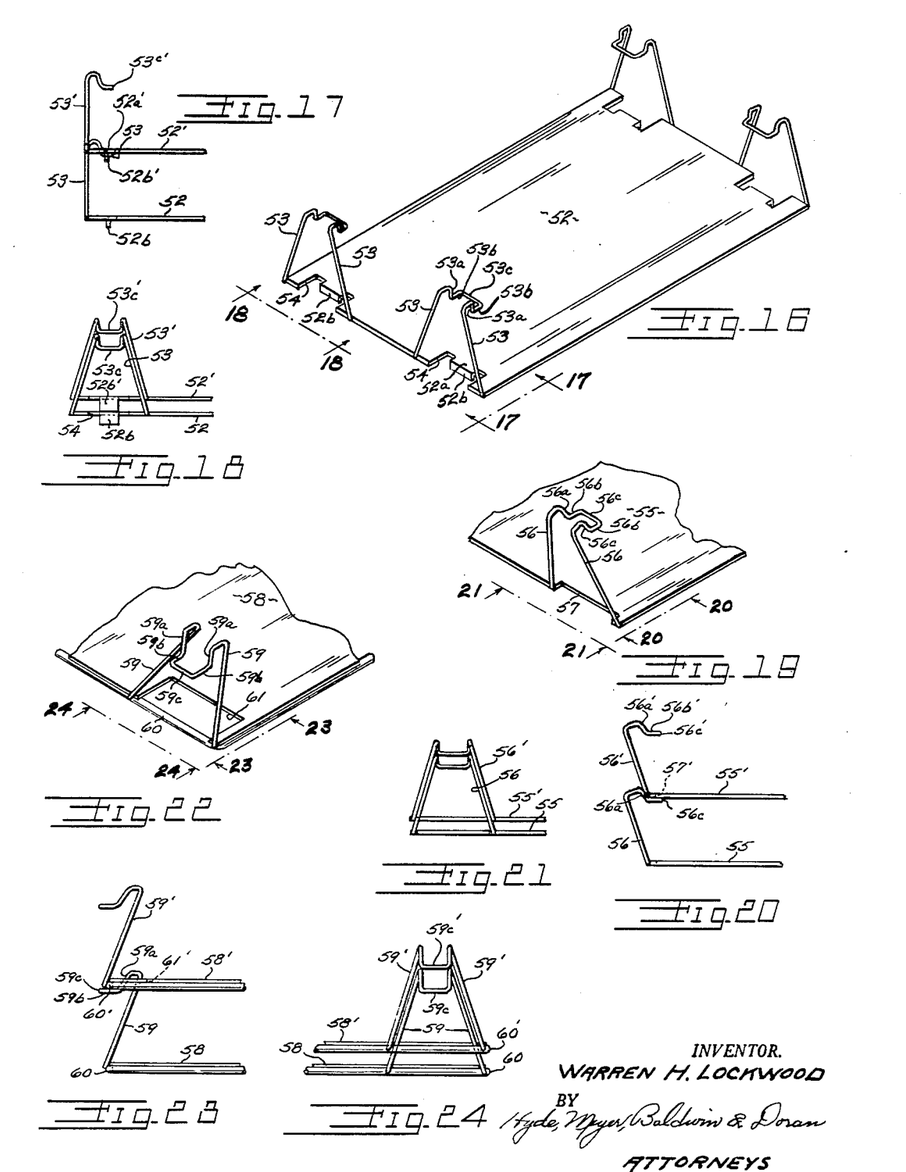
Fig. 16 is perspective view of another modification of my invention wherein the upper support portions are provided by bifurcated wire loops at the four corners of a rectangular bottom, the wire loops having their bifurcated arms rigidly secured to the bottom, and the bights at the upper ends of the wire loops providing upper support portions.
Fig. 17 is a fragmental view taken in the position of the line 17—17 of Fig. 16 and showing portions of two of the receptacles of Fig. 16 in tiered relationship.
Fig. 18 is a fragmental view taken along the line 18—18 of Fig. 16 and showing portions of two of the receptacles of Fig. 16 in a fully nested relationship.
Fig. 19 is a fragmental perspective view of one corner of another modification of my invention, it being understood that the other four corners are arranged in a like manner following the general relationship of Fig. 16.
Fig. 20 is a fragmental view taken along the line 20—20 of Fig. 19 and showing two of the receptacles of Fig. 19 in a tiered relationship.
Fig. 21 is a fragmental view taken along the line 21—21 of Fig. 19 and showing two of the receptacles of Fig. 19 in a fully nested position.
Fig. 22 is a fragmental perspective view of a corner of another receptacle showing another modification of my invention, it being understood that the four corners of the receptacle are furnished in the like manner following the general pattern of Fig. 16.
Fig. 23 is a fragmental side elevational view taken generally from the position of line 23—23 of Fig. 22 and showing two of the receptacles of Fig. 22 in a tiered relationship.
Fig. 24 is a fragmental end elevational view taken generally along the line 24—24 of Fig. 22 and showing two of the receptacles of Fig. 22 in a fully nested relationship.

In Figs. 16, 17 and 18, another modification of my invention is indicated where the bottom 52 of the receptacle is generally rectangular, having four posts in the form of bifurcated loops 53 rigidly secured near the four corners of the rectangular bottom. The bight at the upper end of each of the wire loops is bent downwardly at each side as indicated at 53a, then outwardly at 53b toward the center of the receptacle and the closing, or central portion of the bight 53c is generally parallel to the bottom 52. It will be noted that the parts 53c of the four wire loops provide the upper support portions which are vertically above the bottom 52 and located inwardly of the end edges of the bottom. The lower support portions are the parts of the bottom at 52a vertically below the upper support portions 53c. Preferably, but not necessarily, hook-like portions of the bottom are turned downwardly as indicated at 52b to firmly support two receptacles like Fig. 16 when in tiered relationship as indicated at Fig. 17. In that figure, the bottom 52' of the upper receptacle has its lower support portions 52a' resting upon the bight 53c of the upper support portions of the lower receptacle, and the tongues 52b' of the upper receptacle are hooked over the portion 53c of each loop of the lower receptacle, the width of tongue 52b' being such that it fits snugly between the parts 53b of the wire loop connected with the lower receptacle. Thus, the upper receptacle cannot move in any direction when the two receptacles are tiered. In nesting, two receptacles made like in Fig. 16, the upper receptacle is tilted to permit the tongues 52b' of an upper receptacle to pass beneath the loops 53 of a lower receptacle, after which the upper receptacle may move down to a nested relationship as indicated in Fig. 18. There are clearways between the bottom and the upper bight of each wire loop to permit this nesting action, and in addition thereto, other clearways include the slots or recesses 54 cut into the ends of the bottom 52 and of a width and of a depth permitting the passage of a bottom 52' of an upper receptacle down over the upper ends of the loops 53 of a lower receptacle. It will be noted that the bifurcated arms of each loop 53 lie in a plane normal to the bottom 52 and the arms of a given loop slope upwardly and inwardly toward each other so as to permit the fully nested position of two receptacles indicated in Fig. 18.

In Figs. 19, 20 and 21, I have shown another modification which is quite similar to Fig. 16 and, therefore, I have indicated only the lower left-hand corner of a receptacle, it being understood that the other corners are treated in a like manner analogous to Fig. 16. Here the receptacle has a bottom 55 generally rectangular in form and having bifurcated wire loops 56 having their bifurcated arms rigidly secured to the outer ends of the bottom 55 near each of the four corners thereof. The bight at the upper end of each wire loop is bent inwardly and downwardly at 56a, then inwardly and horizontally over the bottom at 56b, and has a central upper support portion 56c generally parallel to the bottom 55. Clearways are provided between the bifurcated arms of the loop 56 and also by means of an inwardly extending recess or slot 57 in the end edge of the bottom below each of the wire loops 56 and permitting the passage of a bottom 55' of an upper receptacle downwardly over the wire loop 56 of a lower receptacle in the nesting operation. Fig. 20 shows the tiered relationship wherein the bottom 55' of an upper receptacle, just inwardly of its associated recess 57', rests upon the upper support portion 56c of a lower receptacle. Here, the portions 56a of the four wire loops 56 of the lower receptacle prevent endwise movement of the bottom 55' of the upper receptacle when tiered as shown in Fig. 20. There is some resistance to lateral movement at right angles to the longer dimension of the receptacle because the end edges of the recess 57' of the upper receptacle bear against the bent portions 56a of the wire loops 56 of the lower receptacle. If desired, a tongue similar to 52b of Fig. 16 could be added to the structure of Fig. 19. It will be noted that the bifurcated arms of each of the wire loops 56 lie in a common plane which slopes upwardly and outwardly from the bottom 55. As shown in Figs. 19 and 20, this calls for only a shallow recess 57 to permit nesting of two like receptacles. If the outward slope of the bifurcated arms 56 is great enough, no recess 57 in the bottom would be required for nesting. The bifurcated arms 56 slope upwardly and toward each other in each of the wire loops and this permits the close nested relationship seen in Fig. 21.

In Figs. 22, 23 and 24 I have shown still another modification of my invention which is closely related to the forms shown in Figs. 16 and 19. Here the receptacle has a generally rectangular bottom 58 having rigidly secured to each of the four corners thereof a bifurcated wire loop 59 welded to the outer edge of the bottom at the ends thereof and near the corners. At the upper end of each of these loops, the wire is bent outwardly and downwardly as indicated at 59a, then outwardly and horizontally at 59b, and the central horizontal portion of the bight at 59c, parallel to the bottom 58, provides the upper support portions for my invention. The lower support portions are provided by a bar 60 lying directly below the portions 59b and 59c of each wire loop. In the form shown, this bar 60 is part of a heavy wire which extends continuously around the four sides of the bottom 58 and is rigidly secured thereto as by welding. Clearways are provided between the bifurcated arms of the wire loops 59 and by means of a recess 61 formed in the bottom at each corner thereof and extending inwardly from the bar 60. Each recess 61 is of a length and width sufficient to pass the bight of a wire loop 59 therethrough. In tiering two receptacles like that described in Fig. 22, the bar 60' of an upper receptacle rests on the portions 59b and 59c of a lower receptacle. The relationship between the bars 60' of the upper receptacle and the portions 59a of the lower receptacle prevent any substantial endwise movement of the two receptacles in tiered relationship as shown in Fig. 23. The end edges of each recess 61' of an upper receptacle lie on opposite sides of the parts 59a of the lower receptacle and prevent any substantial lateral movement between the two receptacles in tiered relationship. Here the bifurcated arms 59 of each wire loop lie in a common plane which slopes upwardly and inwardly toward the receptacle from the position of attachment of the lower ends of the bifurcated arms to the bottom 58. The bifurcated arms 59 of each wire loop slope upwardly and inwardly toward each other so as to permit the closely nested relationship indicated in Fig. 24.

Figures 25, 26, 27, 28, 30:
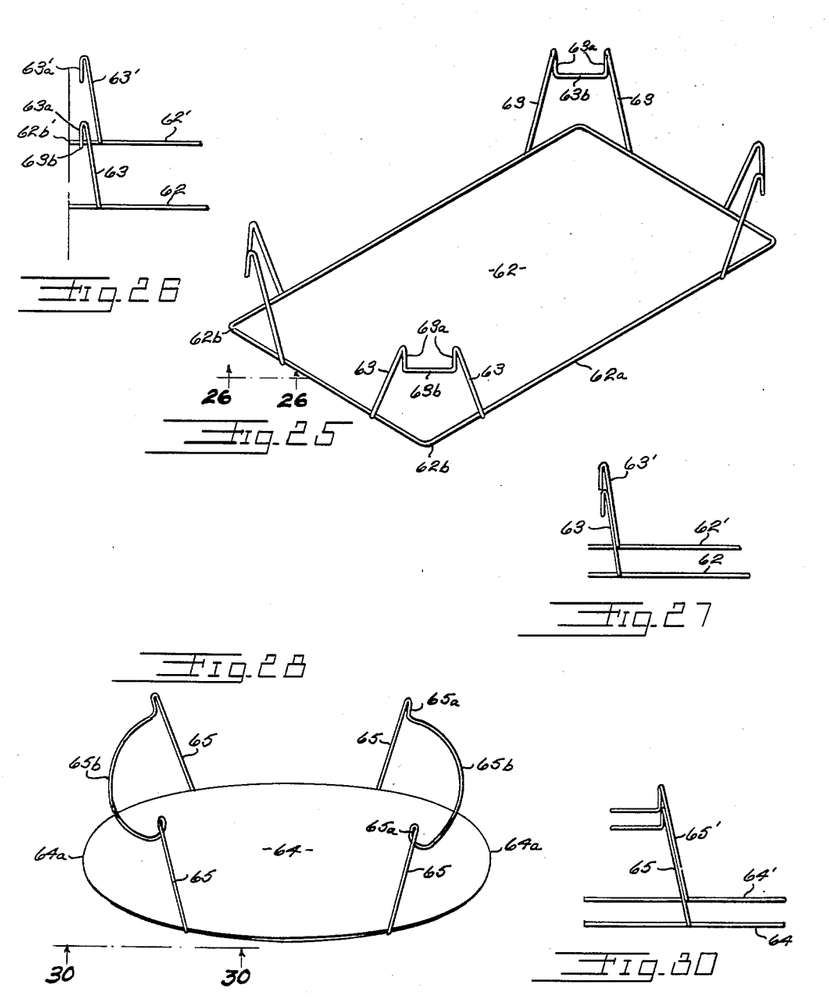
Fig. 25 shows another modification of my invention somewhat resembling Fig. 13 and having bifurcated wire loops straddling the four corners of a rectangular bottom and having their bifurcated arms rigidly secured to the bottom, the bights at the upper ends of the wire loops being formed to snugly receive and hold the corners of the bottom of a like receptacle when tiered thereupon.
Fig. 26 is a fragmental view taken along the line 26—26 of Fig. 25 and showing two receptacles like Fig. 25 in a tiered relationship.
Fig. 27 is a view taken from a position similar to Fig. 26 and showing two of the receptacles of Fig. 25 in a fully nested relationship.
Fig. 28 is a perspective view of another modification of my invention wherein the receptacle has an elliptical bottom.
Fig. 30 is a fragmental view taken along the line 30—30 of Fig. 28 and showing two of the receptacles of Fig. 28 in fully nested relationship.

In Figs. 25, 26 and 27, I have shown a receptacle somewhat similar to Fig. 13. Here the receptacle has a rectangular bottom 62, the sides of which may be reinforced by a heavy wire 62a extending entirely around the bottom, although it will be understood that this edge reinforcement is not necessary to the carrying out of my invention. At each of the four corners of the bottom, a post is provided comprising a bifurcated wire loop 63 having its bifurcated arms rigidly secured to the bottom and straddling the corner at each of the four corners of the bottom. At its upper end, each of the wire loops is bent downwardly at 633a and connected by a central portion 63b which is generally parallel to the bottom 62 and provides the upper support portion at each of the four corners. The lower support portion is that part of the bottom lying directly beneath the parts 63b. In tiering two receptacles like Fig. 25, as shown in Fig. 26, each of the corners 62b' of an upper receptacle rests in the bight of each of the wire loops 63 of the lower receptacle and specifically on the upper support portion 63b thereof. The parts are preferably so dimensioned that when the upper receptacle has its perimeter vertically aligned above the perimeter of the lower receptacle, each corner 62b' of the upper receptacle fits snugly between the portions 63a of each of the wire loops on the lower receptacle. This prevents lateral movement in any direction between the two receptacles in tiered relationship as shown in Fig. 26. It will be noted that the bifurcated arms 63 of each of the wire loops lie in a common plane which slopes upwardly and outwardly from the bottom permitting the closely nested relationship of two receptacles as indicated in Fig. 27. Here again, the nesting action takes place by tilting the upper receptacle so as to cause the corners 62b either at one end or at one side of the upper receptacle to pass into the clearways between the bifurcated arms 63 of two of the loops of a lower receptacle. Then the bottom of the upper receptacle will pass downwardly to the nested position shown in Fig. 27.

Figure 29:
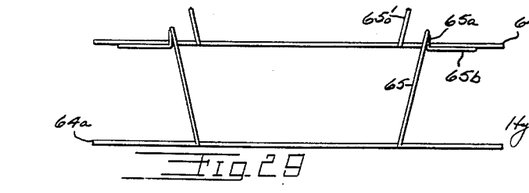

In Figs. 28, 29 and 30 another form of my invention is indicated where the receptacle has a bottom 64 which may be round or elliptical in shape, an ellipse or oval being shown. At opposite ends thereof a rather wide bifurcated wire loop 65 is provided having its bifurcated arms rigidly secured as by welding to the outside of the bottom 64. Each wire loop at its upper end is bent downwardly as indicated at 65a and then the bight of the wire loop extends generally parallel to the bottom 64 forming a long arcuate upper support portion 65b generally parallel to the bottom 64. In nesting two like receptacles, the upper receptacle is tilted so that the end 64a' thereof will pass beneath the bight 65b of a lower receptacle at one end, after which there is a clearway permitting the bottom 64' of the upper receptacle to pass downwardly to the fully nested position indicated in Fig. 30. The bifurcated arms 65 of each of the wire loops lie in a common plane which slopes upwardly and outwardly from the bottom 64 so that the bifurcated arms 65' of an upper receptacle lie closely against the bifurcated arms 65 of a lower receptacle in the nested position of Fig. 30. In the tiered relationship shown in Fig. 29, the ends 64a' of an upper receptacle lie on the upper support portions 65b of the two wire loops of a lower receptacle as shown in Fig. 29. Preferably, the bottom 64' of the upper receptacle lies snugly between the portions 65a of each of the wire loops of the lower receptacle so as to prevent lateral shifting of the two receptacles in the tiered relationship.

It will be noted in every form of my invention described herein, that the parts of the receptacle permit its nesting and tiering with another like receptacle with the primeter of the upper receptacle vertically directly aligned above the perimeter of the lower receptacle.

What is claimed is:

1. A receptacle adapted for tiering and nesting with receptacles of like construction comprising a bottom having two end edges and two sides edges and providing a load supporting and carrying surface, upstanding separate connector portions rigidly attached to the end edges of said bottom and spaced along said bottom end edges, there being a plurality of upper tiering support portions one rigid with each of said connector portions near the upper end thereof, there being a plurality of lower tiering support portions rigidly attached to the bottom near each of its end edges, said upper support portions being vertically above said lower support portions, there being a plurality of said support portions spaced about the periphery of said bottom and adapted to hold an upper receptacle tiered upon a lower receptacle when said lower support portions of an upper receptacle engage upon complementary upper support portions of a lower like receptacle, there being clearways provided in said receptacle, each clearway extending upwardly from one of said lower support portions toward and directly beneath one of said upper support portions for receiving normally interfering parts including upstanding connector portions of a second like receptacle to permit nesting movement of an upper receptacle within a lower like receptacle only when the bottom of the upper receptacle is tilted in a plane non-parallel to the bottom of the lower receptacle, said support portions and connector portions being so constructed and arranged as to nest with like parts of a like receptacle, and the parts of said receptacle permitting its nesting and tiering with another like receptacle with the perimeter of the upper receptacle vertically directly aligned above the perimeter of the lower receptacle.

2. A receptacle as in claim 1 wherein said connector portions are spaced sheet metal portions connected with said bottom on opposite sides thereof, said lower support portions are tongues extending laterally away from said bottom beyond the zone where said connector portions join said bottom and said clearways are openings provided in said connector portions extending upwardly from said tongues.

3. A receptacle as in claim 1 wherein said connector portions are spaced sheet metal portions connected with said bottom on opposite sides thereof, said lower support portions are tongues extending laterally away from said bottom beyond the zone where said connector portions join said bottom, and said upper support portions are projections from said connector portions extending over said tongues.

4. A receptacle as in claim 1 wherein said connector portions comprise a plurality of upstanding posts, said lower support portions are tongues extending laterally away from said bottom beyond the zone where said posts join said bottom, and said upper support portions are projections from said posts extending over said tongues.

5. A receptacle as in claim 1 wherein said connector portions comprise a plurality of upstanding posts, said upper support portions comprise projections extending sideways from the upper ends of said posts, and said clearways comprise slots in said bottom through which said projections will pass.

6. A receptacle as in claim 1 wherein said connector portions comprise bifurcated wire loops having their bifurcated arms rigidly secured to said bottom.

7. A receptacle as in claim 1 wherein said connector portions comprise bifurcated wire loops having their bifurcated arms rigidly secured to said bottom, said upper support portion on each loop comprises the bight of said loop bent inwardly toward the receptacle, and said clearways include slots in said bottom through which the bights of another like receptacle will pass.

8. A receptacle as in claim 1 wherein said connector portions comprise bifurcated wire loops having their bifurcated arms rigidly secured to said bottom, said upper support portion on each loop comprises the bight of said loop bent inwardly toward the receptacle, and said clearways include slots in said bottom through which the bights of another like receptacle will pass, and means rigidly connected with said bottom adjacent each lower support portion adapted to interengage with said loop bights of another like receptacle and preventing relative movement sideways between two like receptacles when tiered.

9. A receptacle as in claim 8 wherein said bifurcated arms extend upwardly in a plane substantially normal to said bottom.

10. A receptacle as in claim 8 wherein said bifurcated arms extend upwardly in a plane inclined outwardly away from said receptacle.

11. A receptacle as in claim 1 wherein said connector portions comprise bifurcated wire loops having their bifurcated arms rigidly secured to said bottom, said upper support portion on each loop comprises the bight of said loop bent outwardly away from the receptacle and then downwardly and outwardly, there being an opening through the bottom of said receptacle substantially registered vertically below each of said loop bights through which the loop bights of a like receptacle may pass, and a bar along the outer side of each of said openings, said bars forming said lower support portions.

12. A receptacle as in claim 1 wherein said bottom is generally rectangular, said connector portions comprise bifurcated wire loops having their bifurcated arms straddling the corners of said bottom and rigidly secured to said bottom.

13. A receptacle as in claim 12 wherein a recess is formed in the bight of each of said bifurcated loops adapted to receive and hold, against lateral displacement, the corners of the bottom of a like receptacle tiered upon it.

14. A receptacle as in claim 12 wherein the corners of said bottoms are turned downwardly to form hooks there, and a recess is formed in the bight of each of said bifurcated loops adapted to receive and hold, against lateral displacement, said hooks of a like receptacle tiered upon it.

15. A receptacle adapted for tiering and nesting with receptacles of like construction comprising a generally rectangular bottom, upstanding connector portions one near each corner of said bottom and each having an upper bight and bifurcated arms extending downwardly from opposite ends of said bight, said arms rigidly connected with said bottom at their lower ends, said bights providing upper support portions, said bottom providing a plurality of lower support portions one vertically beneath each of said upper support portions, there being clearways provided in said receptacle for receiving normally interfering parts of a second like receptacle to permit nesting of an upper receptacle within a lower like receptacle only when the bottom of the upper receptacle is tilted in a plane non-parallel to the bottom of the lower receptacle, said support portions and connector portions being so constructed and arranged as to nest with like parts of a like receptacle, and said lower support portions of one receptacle interengaging with said upper support portions of an underlying like receptacle for maintaining a plurality of like receptacles in vertical tiered alignment with the perimeter of an upper receptacle vertically directly aligned above the perimeter of a lower receptacle.

16. A receptacle adapted for tiering and nesting with receptacles of like construction, comprising rigidly interconnected parts including a bottom load supporting part, and connector parts rigidly connected with said bottom part along opposite edges of said receptacle, said aforementioned parts including upper tiering support portions rigidly connected with said connector parts, said aforementioned parts including lower tiering support portions rigidly connected with said bottom part, said upper support portions being above corresponding lower support portions for permitting the lower support portions of an upper receptacle to engage and rest upon the corresponding upper support portions of a like lower receptacle in tiering position, there being clearways provided in said receptacle for receiving normally interfering parts to permit nesting movement of an upper receptacle by manipulation downwardly into nesting position within said lower receptacle, each upper tiering support portion including an upwardly opening hook having its distal end spaced inwardly from its rigidly connected connector part, each clearway including a recess in one of the opposite edges of said bottom part, the dimensions of said receptacle permitting said recesses of an upper receptacle to pass over said hooks of a lower receptacle during movement of said upper receptacle from tiering to nesting positions; each of said lower tiering support portions including a hole rigid with said bottom part, located along one of said opposite edges of said bottom part, and located contiguous to the recess adapted to pass over the hook engageable with said last mentioned hole in tiering position.

17. A receptacle adapted for tiering and nesting with receptacles of like construction, comprising rigidly interconnected parts including a bottom load supporting part, and connector parts rigidly connected with said bottom part along opposite edges of said receptacle, said aforementioned parts including upper tiering support portions rigidly connected with said connector parts, said aforementioned parts including lower tiering support portions rigidly connected with said bottom part, said upper support portions being above corresponding lower support portions for permitting the lower support portions of an upper receptacle to engage and rest upon the corresponding upper support portions of a like lower receptacle in tiering position, there being clearways provided in said receptacle for receiving normally interfering parts to permit nesting movement of an upper receptacle by manipulation downwardly into nesting position within said lower receptacle, said connector parts and upper tiering support portions including at at least one upper tiering support portion a wire bent upon itself at one end joining two portions of said wire extending toward one of said connector parts to form said upper tiering support portion with these two wire portions diverging downwardly thereafter to form boundaries of the rigidly connected connector part, each clearway including a recess in one of the opposite edges of said bottom part, the dimensions of said receptacle permitting said recesses of an upper receptacle to pass over said upper tiering support portions of a lower receptacle during movement of said upper receptacle from tiering to nesting positions; each of said lower tiering support portions being located along one of said opposite edges of said bottom part, and located contiguous to the recess adapted to pass over the upper tiering support portion engageable with said last lower tiering support portion in tiering position.

References Cited in the file of this patent

UNITED STATES PATENTS

| | | |
|---|---|---|
| 2,223,554 | Davis | Dec. 3, 1940 |
| 2,490,269 | Johnson | Dec. 6, 1949 |
| 2,497,574 | Bahnson | Feb. 14, 1950 |
| 2,609,120 | Williams | Sept. 2, 1952 |
| 2,614,703 | Molins | Oct. 21, 1952 |
| 2,684,766 | Blom | July 27, 1954 |
| 2,765,099 | Lively | Oct. 2, 1956 |
| 2,782,936 | Lockwood | Feb. 26, 1957 |
| 2,844,090 | Witter | July 22, 1958 |